Nov. 14, 1961     E. J. FITZ ET AL     3,008,181
MOLDING APPARATUS AND METHOD

Filed March 31, 1959     5 Sheets-Sheet 1

INVENTORS
Edward J. Fitz
Michael A. Sorokin
BY
Johnson and Kline
ATTORNEYS

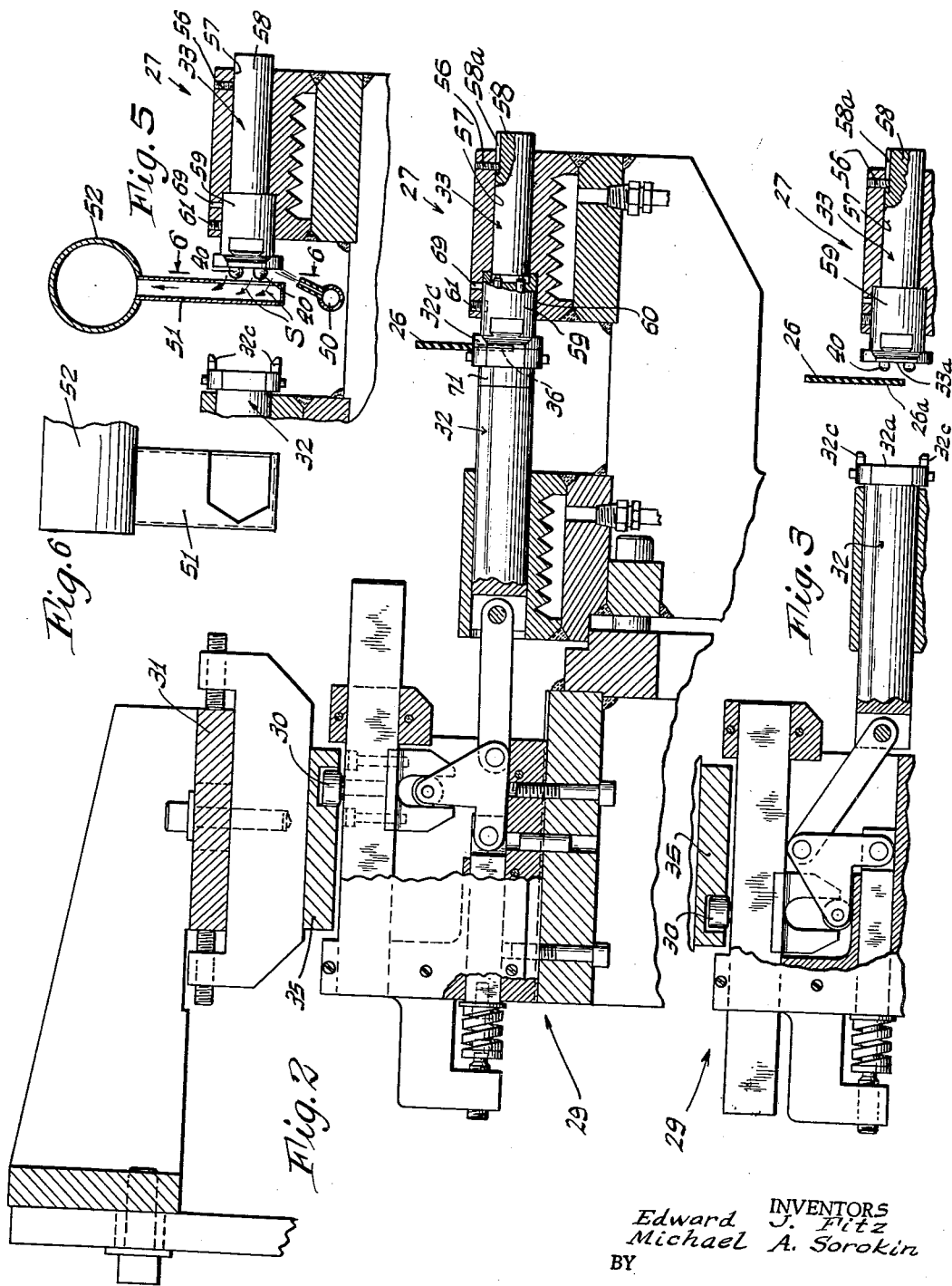

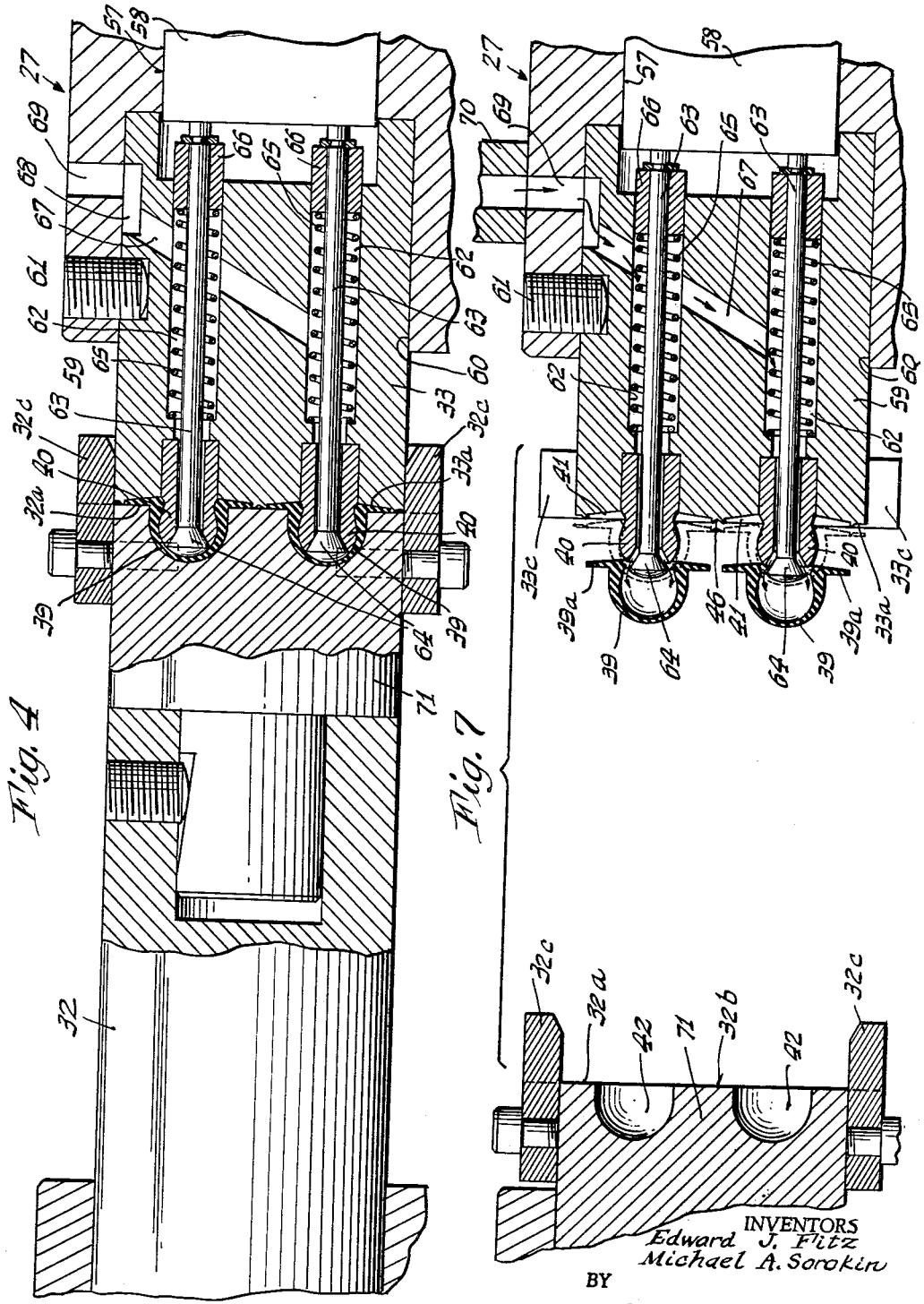

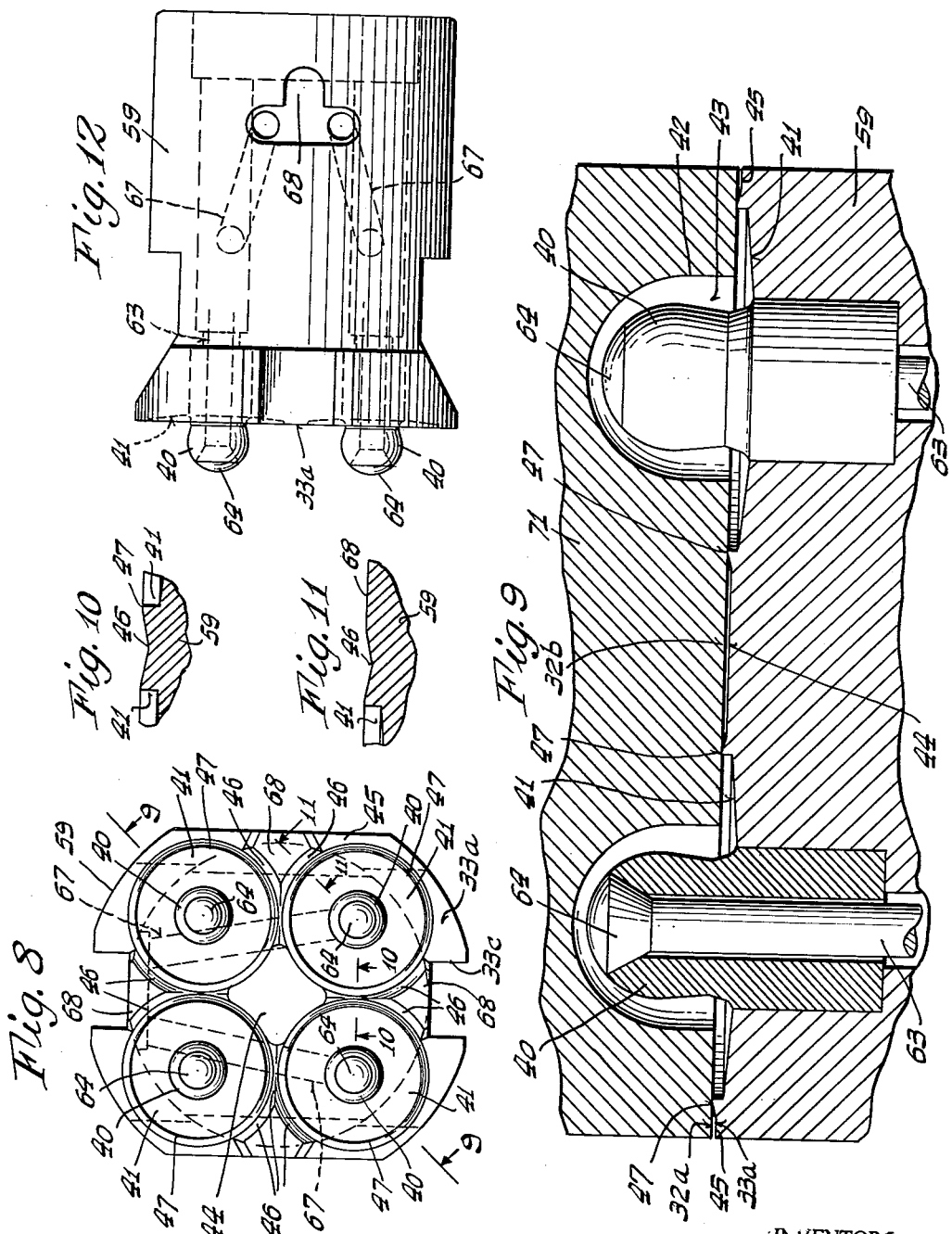

Nov. 14, 1961 E. J. FITZ ET AL 3,008,181
MOLDING APPARATUS AND METHOD
Filed March 31, 1959 5 Sheets-Sheet 5

INVENTORS
Edward J. Fitz
Michael A. Sorokin
BY
Johnson and Kline
ATTORNEYS

United States Patent Office 3,008,181
Patented Nov. 14, 1961

3,008,181
MOLDING APPARATUS AND METHOD
Edward J. Fitz, Fairfield, and Michael A. Sorokin, Milford, Conn., assignors to The Eagle-Picher Company, Cincinnati, Ohio, a corporation of Ohio
Filed Mar. 31, 1959, Ser. No. 803,216
3 Claims. (Cl. 18—5)

This invention relates to the molding of articles from plastic material. More specifically, it pertains to an apparatus for continuously molding plastic articles at high speeds.

Prior to this invention, there was disclosed in the U.S. patent to Henry Z. Gora, No. 2,864,123, issued December 16, 1958, a method of molding articles which included the steps of plasticizing material, producing an endless strip thereof and passing the latter between pairs of cooperating die members which blank material from the strip and mold it to shape. A series of pairs of axially aligned die members were mounted in parallel relation on a carrier in the form of a wheel adapted to travel in a closed path. A strip of plasticized material was guided longitudinally into the space between the die members of successive pairs, when open, and thereafter the die members were closed on the strip to blank out and mold a portion of the strip in the die cavity. The cavities were kept closed during most of the travel of the die members in their cycle of movement to set the material to the desired shape and size, and then the dies were opened and the molded article was ejected therefrom for further treatment, if desired.

It has been found, with respect to removing the strip of moldable material from engagement with the die members, that difficulties are encountered when the members are of large size and adjacent pairs of members are closely spaced; there is a tendency for pieces of the strip to jam between or stick to adjacent pairs of die members, when the strip is ripped from the dies thus reducing the efficiency and utility of the molding apparatus. This problem is often caused and aggravated when the die members are of the multi-cavity variety.

The present invention overcomes the problem of removing the strip of moldable material from engagement with the die members by guiding the continuous strip of moldable material between successive traveling separated pairs of die members, at the charging station, in such a manner that only a lateral edge of the strip is engaged by the dies when they are brought together to blank a portion therefrom. The effect of this is for the dies to take a bite from the edge of the strip leaving a notch in the strip, thereby facilitating the removal of the remainder or untouched portion of the strip from the die members without the necessity of separating the members or forcefully ripping the strip therefrom.

A feature of the invention is the relationship of the die faces to the strip at the time the material is blanked therefrom. According to the invention only so much of the strip will be engaged by the faces of the dies as is necessary to blank a charge of sufficient volume to cover the complete working surfaces of the die faces when the material is molded. As the material is molded, and if it is of sufficient volume, it will flow across the die faces to completely cover the working portions thereof.

It is, therefore, an important object of the invention to provide a molding apparatus wherein charges of moldable material are blanked from a lateral edge of a continuous strip of moldable material by successive pairs of cooperating axially aligned die members, so that the strip is enabled to be slipped out of engagement with the die members without the necessity of forcefully ripping it therefrom.

Another problem which is encountered in the use of prior art molding apparatus and methods relates to the handling of overflow or excess moldable material between the dies. It will be understood that when die members blank a charge of moldable material from a continuous strip thereof and the material of the charge flows to fill the die cavity, the excess material must be expelled or otherwise relieved to prevent it from interfering with the proper operation of the molding dies. Likewise, the excess material which expands out of the molding cavity or cavities during the molding operation must be accommodated or provided with an avenue of escape. These problems are particularly aggravated when multi-cavity die members are being used since the charge of moldable material must be greatly in excess of that required to fill the molding cavities and must be enabled to flow across the die faces to fill each of the cavities.

According to the present invention the problem of handling excess molding material trapped between the die members and facilitating the flow of the material across the die faces is solved by forming cooperating excess material receiving chambers between the mating die faces, and communicating such chambers by forming open passageways therebetween. The passageways which facilitate the flow of excess material between the relieving chambers extend around the molding cavities and thereby prevent the material from flowing across the molding cavities during the molding operation.

Another object of the invention, therefore, is the provision in a molding apparatus of die members having cooperating means therebetween for relieving the molding cavities of excess moldable material and facilitating the escape of such material from the molding cavities and accommodating it during the molding cycle.

Still another object of the invention is to provide a molding apparatus wherein the multi-cavity die members of each pair are formed with means for controlling the flow of excess moldable material from and around the cavities and pinching it off from the molded articles to facilitate its removal by suction or similar means from the die members after the members are separated.

Another problem which has been encountered in molding operations, particularly when utilizing multi-cavity die members, relates to the ejection of the molded articles from the dies at the end of the molding cycle and the stripping of the flash or excess moldable material therefrom. As previously noted, when a single piece of moldable material is blanked from a strip to charge a plurality of molding cavities in a die, a quantity of excess moldable material flows across the face of the die and extends between the die cavities. This material or flash is retained between the die members during the molding cycle and must be stripped therefrom and from engagement with the finished molded articles either at the time the molded articles are ejected from the die members or at some later time.

According to the present invention the problem of ejecting the finished molded articles from between the die members and handling the flash, is solved by removing the excess moldable material from the die members immediately after they are separated at the discharging station by suction or similar means and thereafter ejecting the finished molded article by air pressure. This is accomplished by directing a jet of air at the die face to strip the flash therefrom, thus facilitating its removal by suction and thereafter forcing air through valved ports or orifices provided in each of the molding cavities to eject the molded articles therefrom.

It is therefore, also an object of the invention to provide a molding apparatus, wherein multi-cavity die members are utilized, in which excess moldable material is removed from the die members immediately upon their being separated at the discharging station and thereafter the individual molded articles are ejected therefrom.

It is also an object of the invention to provide a molding apparatus wherein, immediately on the die members being separated at the discharging station, the flash of excess moldable material is broken away from the die on which it is retained and from the molded article and is removed by suction from between the dies.

A further object of the invention is to provide a molding apparatus wherein one of the die members of each pair of die members is provided with integral automatically operating air pressure ejecting means for ejecting the molded articles from between the dies.

A still further object of the invention is to provide an apparatus and method for continuously molding articles which facilitates the charging of the dies with moldable material and the removal of the charging strip therefrom, the handling and disposition of excess moldable material between the dies, the ejection of the finished molded article and the flash, and which is simple to utilize and readily adapted to modern quantity production operations.

Other objects and advantages of the invention will be apparent from the specification and claims when considered in connection with the attached sheets of drawings, illustrating one form of the invention, wherein like characters represent like parts and in which:

FIG. 2 is a detail view, partially broken away and in section, of a pair of die members with their related operating mechanism, the die members and operating mechanism being illustrated in initial die closed position;

FIG. 3 is a fragmentary detail view partially in section of the die members and operating mechanism of FIG. 2 in die open position just prior to the blanking of a charge of moldable material;

FIG. 4 is an enlarged detail view, partially broken away and in section, of the die members in die closed position during the molding operation;

FIG. 5 is an illustrative fragmentary view, in section, showing the die members in separated position with means for sucking the excess molding material therefrom;

FIG. 6 is a view taken in the direction of arrows 6—6 in FIG. 5;

FIG. 7 is an enlarged fragmentary detail view, in section, of the die members in separated position and illustratively shows the ejection of the molded articles therefrom;

FIG. 8 is a plan view, shown partially in dotted lines, of the die face of the male die member;

FIG. 9 is a fragmentary cross-sectional view of the male die member, taken in the direction of the arrows 9—9 in FIG. 8, and showing the female die member in engaged position therewith;

FIG. 10 is a fragmentary sectional view taken in the direction of the arrows 10—10 in FIG. 8;

FIG. 11 is a fragmentary sectional view taken in the direction of arrows 11—11 in FIG. 8;

FIG. 12 is a top plan view, shown partially in dotted lines, of the male die member of FIG. 8;

Figure 1:
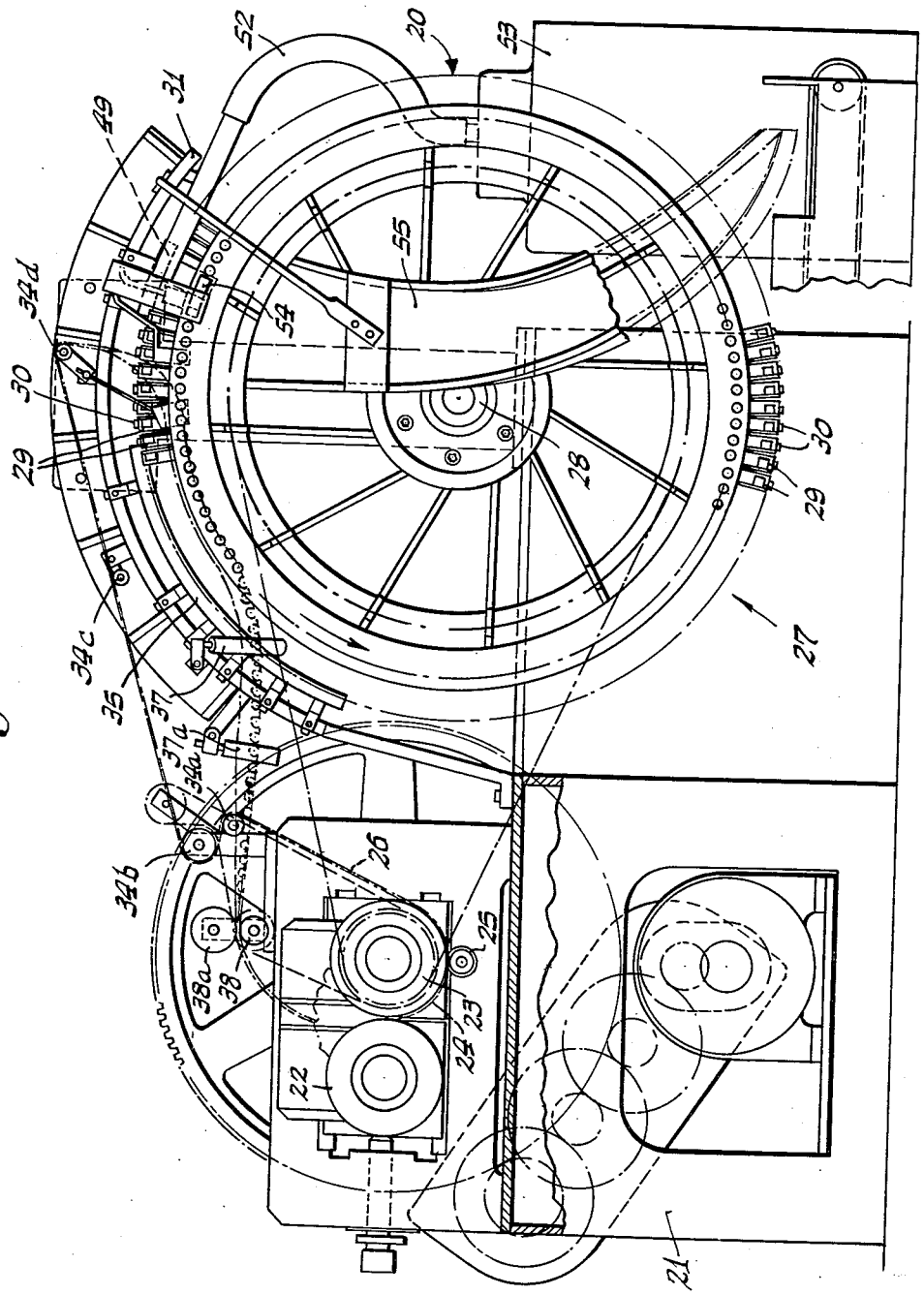
FIGURE 1 is an illustrative side elevational view of an improved molding apparatus according to the invention.
Figure 13:
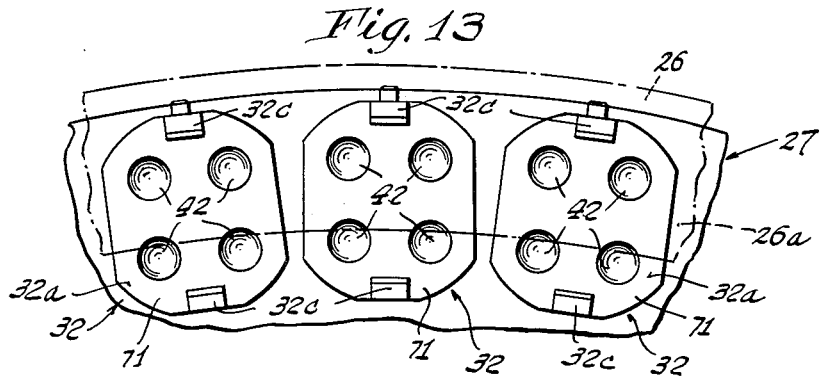
FIG. 13 is an illustrative plan view showing the relationship between the die faces and the strip of moldable material prior to blanking a charge therefrom.

Referring now to the drawings for a more detailed description of the invention, in FIG. 1 the invention is shown as embodied in a molding apparatus, generally indicated by the numeral 20, of the type illustrated and described in U.S. Patent No. 2,864,123 (supra).

The molding apparatus embodying the concepts of the invention comprises a frame 21 at one end of which is mounted a pair of mill rollers 22 and 23 on which a quantity of moldable material, such as rubber or the like, may be plasticized to form on the roll 23 an enveloping layer 24 of determinate thickness controlled by the spacing between the mill rollers. Cutters 25 remove from the layer 24 a strip 26 of determinate width, the void resulting in the layer 24 being constantly filled by migration of the material in the bank so that the strip 26 is continuous so long as the bank is maintained and the machine is operated.

At the other end of frame 21 is a drum or wheel-like carrier 27 mounted on a horizontal shaft 28 for rotation in a vertical plane. Mounted on the periphery of carrier 27 is a series of operating units 29 closely spaced and each including a cam follower 30. Secured to frame 21 and overlying the carrier 27 for a portion of the arc of the latter's movements is a cam support 31 on which a plurality of cams are mounted in a position to engage the follower 30 as the carrier rotates. Also mounted on the periphery of the carrier is a series of pairs of axially aligned relatively movable multi-cavity die members 32 and 33 (see FIG. 2).

As shown more clearly in FIGS. 2 and 3, the die members 32 are mounted to move axially toward and away from the die members 33, into engaged and separated position, and each is connected to an axially aligned operating unit 29 by which it is operated when the cam follower 30 reaches and is operated by the cams on the cam support 31 during the rotation or travel of the carrier. The position of the die members relative to one another, for maintaining the proper alignment of the die cavities, is accomplished by providing die member 32 with fingers 32c adapted to be received in slots 33c formed in die member 33 for guiding the members into engaged molding position. In the illustrated form of the invention the die members 33 are mounted so as not to be movable for molding purposes.

In the open or separated position of the die members there is a space between the members into which the strip 26 of moldable material is guided from the mill rollers by guides 34a, 34b, 34c and 34d. The guides are set at such angles that the horizontally disposed strip is twisted to lie in a vertical plane so that the strip enters the space between the die members substantially tangentially to the path of travel of the die members. In order to facilitate the removal of the strip of moldable material from engagement with the dies after a portion is blanked therefrom and to avoid having to forcefully rip the material from around the dies with the resultant possibility of material becoming jammed between adjacent pairs of die members, the guides are positioned so that only a lateral edge of the strip is disposed between the die members for blanking engagement thereby. When the strip is thus located between the die members, cam 35 on support 31 actuates operating unit 29, through follower 30, thereby moving die member 32 toward die member 33 to closed position causing the lateral edge 26a of strip 26 to be engaged between the die members with sufficient force to blank a portion 36 from the strip and deposit it between the die members. Referring now to FIGS. 2, 3, 13 and 14, it will be observed that the bite or notch 26b taken from the edge of strip 26 is only of sufficient depth to obtain a charge of the moldable material having a volume sufficient to completely cover the working portions of the faces of the die members when the articles are being molded; the dies do not penetrate the strip so as to be completely surrounded by molding material and therefore the strip is enabled to be slipped out of engagement with the dies.

Figure 14:
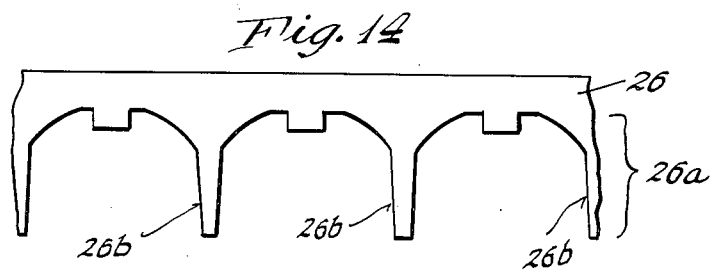
FIG. 14 is an illustraitve fragmentary plan view of the strip of moldable material after the charge has been blanked therefrom.

The strip 26 of moldable material is carried along the path of travel of the die members only as long as is necessary to control the strip. Hence, a short distance along the path of travel of the die members from the charging station, at which point the strip was guided between the separated die members, it is guided away from the engaged die members by guide rollers 37 and 37a and is traveled back to the bank on the mill rollers to there commingle with the bank, the strip being assisted in its return movement by power driven feed roller 38 and pressure roller 38a engaging it. It will be seen that by blanking the charge from the lateral edge of the strip of moldable material, as shown in FIG. 14, the strip will come away freely with a notch therein and there will be no necessity for forcefully ripping the strip from engagement with the die members with the resulting possibility of pieces of the strip becoming clogged or jammed between the adjacent pairs of members.

By quickly removing the skeletonized strip 26 from engagement with the die members, the danger of partially curing the material of the strip by prolonged contact with the heated die members is avoided and the strip is returned to the mill at substantially the same temperature as that at which it left.

After the strip of moldable material has been removed from contact with the die members, the die members are traveled through the molding portion of the cycle toward the discharge station to subject the material being molded to heat for a prolonged period sufficient to cause the material to flow and fill the die cavities and become cured to such a degree that it will maintain its shape and size upon being discharged from the die cavities. The length of time of the molding cycle, i.e. the period during which the die members remain closed on the moldable material, varies with the type of material being utilized, the volume of the article to be molded and the hardness desired in the final molded product. The necessary variations may be achieved by controlling the speed of travel of carrier 27 or in any conventional manner.

The die members, which are here shown as multi-cavity dies, are four cavity units for molding trim clip caps or clip seals 39. As shown, the die members 33 are male dies, having four molding nipples or studs 40 formed in the die faces 33a thereof and having annular dished-out hollows 41 at the base of the nipples for defining the flange or rim 39a of the molded article. The die members 32 are formed with cavities or female die portions 42 for receiving the molding nipples 40 and defining in cooperation with them the molding cavities 43.

In the molding operation, after the die members have blanked a portion from the strip of moldable material forming a charge 36 and are closed on the charge to mold the same, the latter expands and fills the molding cavities and overflows the same to escape past the cut-off surfaces thereof. According to the present invention, cooperating means are provided between the die faces 32a and 33a to enable the molding material of the blank or charge 36 to initially flow across the die faces, to cover all the working parts thereof and fill the molding cavities, and thereafter to permit excess moldable material resuting from expansion in the cavities to escape therefrom.

Figure 15:
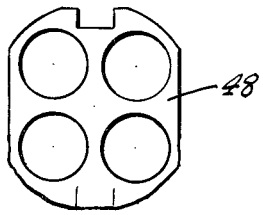
FIG. 15 is an illustrative plan view of the flash or excess moldable material removed from the die members after they have been separated at the discharging station.

In order to enable excess material to escape from the die cavities and to facilitate its flow across the die faces, a hollow 44 is formed in the face 33a of the male die member between the molding cavities cooperating with the similarly situated flat 32b formed on the face 32a of the female die member, for accommodating excess material, during the engaging and in the engaged position of the die members. The peripheral edge of the male die face adjacent the outer edges of the die cavities are likewise cut back or hollowed as at 45 to also receive overflow material in cooperation with the die face 32a of the female die member. Shallow passages 46 communicate hollows 44 and 45 and are defined between the molding die cavities by the cut-off portions 47 thereof for enabling excess material to flow into the hollows 44 and 45 and distribute itself across the surfaces of the dies without crossing the dished-out hollows 41 of the die cavities 43 to form a unitary flash 48, as illustrated in FIG. 15. As the die members become fully engaged during the molding of the articles in the die cavities, the cut-off edges 47 of the cavities pinch off the flash 48 from the molded articles 39 for facilitating a discharging operation to be hereinafter described.

When the die members 32 and 33 have completed their travel through the molding cycle and arrive at the discharging station, follower 30 of operating unit 29 is engaged by a cam 49 and the die members are moved to separated position by the retracting operation of the operating unit. Immediately upon the die members being separated, a blast or jet of air is directed from a nozzle 50, connected to a source of air under pressure (not shown), at the die face of the die member which retains the molded articles and the flash 48. In the illustrated form of the invention (see FIG. 5) the molded articles and flash are retained by the male die member 33 and the nozzle 50 directs the air jet at the die face of that member so as to strip or separate the flash 48 therefrom and break any connection between the flash and the flange or rim 39a of the molded article. Simultaneously, a vacuum is drawn adjacent the face of the die through a vacuum nozzle 51 and a conduit 52 connected to a suction pump 53 or similar means, for sucking the flash from between the dies and removing and transporting it, as indicated by the arrows s, to a waste receptacle, not shown.

Immediately after the flash or excess material 48 has been removed from the face of the die, and as carrier 27 continues to travel the die members along their path of travel, a cam 54 mounted on cam support 31 engages a cam follower which actuates means for ejecting the molded articles from between the dies. While ejection of the molded articles may be accomplished in a variety of ways, according to the present invention it is achieved by directing a stream of air under pressure through the male die member 33 to the molded articles for forcing them from the molding nipples 40 from which they drop into a chute 55 or similar means for transporting them to a receptacle, not shown.

The male die member 33 comprises an elongate plunger or cam follower 58 shiftably slidably received in a bore 57 formed in the carrier 27. A set screw 56 extending into the bore 57 rides in a keyway 58a for retaining the plunger within the bore. A die head 59, on which is formed the die face 33a, is mounted within a bore 60 in carrier 27, of greater diameter than the bore 57 and aligned therewith, and is retained against movement with respect to the carrier by means of a set screw 61 or the like. The head 59 is formed with a plurality of bores 62 corresponding in number to the number of molding nipples 40 formed on the die face and in axial alignment therewith and extending through the nipples. Piston rods 63 are movably housed in each of the bores 62 and are formed with truncated heads 64 having spherical outer ends defining a portion of the surface of molding nipples 40. Each of the rods 63 is biased inwardly of the die member into engagement with the inner end of follower 58, in the outermost position of the latter, for closing bores 62 by springs 65 which seat at one end on a shoulder formed in the bore 62 and at their other end on a collar 66 connected to the rod 63. A plurality of passages 67 are formed in head 59 for communicating the bores 62 with a chamber 68 which in turn is aligned with a laterally extending passage 69 formed in the carrier 27.

In the operation of the article ejecting means, the cam 54, as aforesaid, moves cam follower 58 inwardly of carrier 27 against springs 65 to shift rods 63 longitudinally outwardly of the die member, or to the left as seen in FIGS. 4 and 7, to unseat rod heads 64 from molding nipples 40 thereby providing communication between the interior of bores 62 and the inner surfaces of the molded articles. Substantially simultaneously with the shifting of rod 63, traveling carrier 27 moves the die members into position adjacent a conduit 70 (see FIG. 7) so that the conduit, which is connected to a source of air under pressure (not shown), is aligned with lateral passage 69 in carrier 27. It will be observed (FIG. 7) that as the conduit and passage are aligned, air under pressure enters the chamber 68 through the passage, in the direction of the arrows, and thereafter flows through passages 67 into bores 62 and outwardly thereof around rod 63 to force the molded articles 39 from their seats or retained position on molding nipples 40. In this manner, the molded articels are ejected from between the die members without slowing or stopping the die members in their travel and without utilizing an external stripping mechanism. After the articles have been ejected from die member 33 and continued travel of the die members disengages follower 58 from cam 54 and springs 65 return rods 63 and the follower to their normal position.

It should at this point be noted that the die head 59 of male die member 33 and die head 71 of female die member 32 are removably mounted in their respective die members and are adapted to be changed or substituted as required.

Thus, the concepts of the invention have been described in one embodiment thereof, whereby the removal of a strip of moldable material, from which a charge has been blanked, from engagement with mating die members is facilitated and means are provided to enable the excess molding material to escape from the molding cavities and distribute itself across the die faces. Further, means for continuously automatically ejecting the flash of excess moldable material and the finished molded article from between cooperating dies has been disclosed.

Variations and modifications may be made within the scope of the claims and portions of the improvements may be used without others.

We claim:

1. In an apparatus for molding articles having a succession of pairs of axially aligned relatively movable cavity-forming die members, a carrier means for said die members traveling in a closed path, means for causing the die members of each pair to be separated at a charging station to receive between them a traveling strip of moldable material of determinate width and thickness, means for closing each pair of die members on successive spaced portions of the strip to remove therefrom a charge of moldable material to fill the cavity formed by the die members and mold an article therefrom, and means for removing the remainder of the strip of moldable material from between the die members; the improvement which comprises means for guiding the traveling strip of moldable material into the path of travel of the die members to a position wherein the die members extend over and beyond a lateral edge of the strip so that in removing the charge of moldable material a notch is formed in the strip to facilitate the removal of the remainder of the strip from the die members while the latter remain closed in article-molding position.

2. In an apparatus for molding articles having a succession of pairs of axially aligned relatively movable cavity-forming die members, a carrier means for said die members traveling in a closed path, means for causing the die members of each pair to be separated at a charging station to receive between them a traveling strip of moldable material of determinate width and thickness, means for closing each pair of die members on successive spaced portions of the strip to remove therefrom a charge of moldable material to fill the cavity formed by the die members and mold an article therefrom, and means for removing the remainder of the strip of moldable material from between the die members; the improvement which comprises guide means for the traveling strip of moldable material positioned relative to the path of travel of the die members for guiding the strip to a position wherein the die members extend over and beyond a lateral edge of the strip so that in removing the charge of moldable material a notch is formed in the strip to facilitate the removal of the remainder of the strip from the die members while the latter remain closed in article-molding position.

3. In the method of molding articles between a continuous succession of pairs of axially aligned relatively movable cavity-forming die members traveling in a closed path including the steps of causing the die members of each pair to be separated at a charging station to receive between them a traveling continuous strip of moldable material of determinate width and thickness; in succession closing each pair of die members on successive spaced portions of the strip to remove therefrom a charge of moldable material to fill the cavity formed by the die members and mold an article therefrom; and thereafter removing the remainder of the strip of moldable material from between the die members: the improvement which includes the step of guiding the traveling strip of moldable material between the pair of separated die members to a position relative to the latter in which the die members closing on the strip remove a portion of the strip including a lateral edge thereof whereby a notch is formed in the strip to facilitate the removal of the strip from the die members while the latter remain closed in article-molding position.

References Cited in the file of this patent

UNITED STATES PATENTS

| Number | Name | Date |
|---|---|---|
| 806,472 | Jeffrey | Dec. 5, 1905 |
| 1,455,240 | Cobb | May 15, 1923 |
| 1,567,007 | Raiche | Dec. 25, 1925 |
| 1,754,502 | Denmire | Apr. 15, 1930 |
| 2,148,079 | Martin | Feb. 21, 1939 |
| 2,233,570 | Absmeier | Mar. 4, 1941 |
| 2,304,190 | Milner | Dec. 8, 1942 |
| 2,332,937 | Schmidberger | Oct. 26, 1943 |
| 2,396,406 | Anderson | Mar. 12, 1946 |
| 2,497,212 | Donofrio | Feb. 14, 1950 |
| 2,508,204 | Weber et al. | May 16, 1950 |
| 2,632,227 | Steele et al. | Mar. 24, 1953 |
| 2,689,974 | Meyer | Sept. 28, 1954 |
| 2,719,830 | Flood et al. | Oct. 4, 1955 |
| 2,730,766 | Tompkins | Jan. 17, 1956 |
| 2,744,286 | Carpenter et al. | May 8, 1956 |
| 2,864,123 | Gora | Dec. 16, 1958 |
| 2,898,658 | Harry | Aug. 11, 1959 |